(12) United States Patent
Dunn et al.

(10) Patent No.: US 8,400,430 B2
(45) Date of Patent: Mar. 19, 2013

(54) DISPLAY DEVICE WITH INTEGRAL TOUCH PANEL SURFACE

(75) Inventors: William R. Dunn, Alpharetta, GA (US); Daniel E. Molnar, Lawrenceville, GA (US); Michael LeCave, Gainesville, GA (US)

(73) Assignee: American Panel Corporation, Alpharetta, GA (US)

( * ) Notice: Subject to any disclaimer, the term of this patent is extended or adjusted under 35 U.S.C. 154(b) by 1247 days.

(21) Appl. No.: 10/991,826

(22) Filed: Nov. 18, 2004

(65) Prior Publication Data

US 2005/0184969 A1      Aug. 25, 2005

Related U.S. Application Data

(60) Provisional application No. 60/524,226, filed on Nov. 21, 2003.

(51) Int. Cl.
*G06F 3/042* (2006.01)

(52) U.S. Cl. ........................................ 345/176; 345/175

(58) Field of Classification Search .................. 345/104, 345/173–183; 349/112, 58; 178/18.01, 18.03, 178/18.05–18.07, 18.1
See application file for complete search history.

(56) References Cited

U.S. PATENT DOCUMENTS

| | | | | |
|---|---|---|---|---|
| 5,748,269 A * | 5/1998 | Harris et al. | | 349/58 |
| 5,852,487 A * | 12/1998 | Fujimori et al. | | 349/162 |
| 6,111,699 A * | 8/2000 | Iwata et al. | | 359/599 |
| 6,356,259 B1 * | 3/2002 | Maeda et al. | | 345/173 |
| 6,411,344 B2 | 6/2002 | Fujii | | 349/12 |
| 6,559,834 B1 * | 5/2003 | Murakami et al. | | 345/173 |
| 6,590,622 B1 * | 7/2003 | Nakanishi et al. | | 349/12 |
| 6,654,006 B2 | 11/2003 | Kawashima | | 349/173 |
| 6,707,450 B2 | 3/2004 | Ahn | | 349/173 |
| 6,765,629 B1 | 7/2004 | Jeong | | 349/12 |
| 6,771,327 B2 | 8/2004 | Sekiguchi | | 349/12 |
| 6,781,642 B2 | 8/2004 | Nakanishi | | 349/12 |
| 6,784,948 B2 | 8/2004 | Kawashima | | 349/12 |
| 7,071,925 B2 * | 7/2006 | Matsuda et al. | | 345/173 |
| 2001/0020985 A1 * | 9/2001 | Hinata | | 349/12 |
| 2003/0011315 A1 * | 1/2003 | Ito et al. | | 315/169.3 |
| 2003/0030626 A1 * | 2/2003 | Matsuda et al. | | 345/173 |
| 2003/0222857 A1 * | 12/2003 | Abileah | | 345/173 |
| 2004/0141096 A1 | 7/2004 | Mai | | 349/12 |
| 2004/0141110 A1 | 7/2004 | Yu | | 349/110 |
| 2004/0155991 A1 | 8/2004 | Lowles | | 349/12 |
| 2004/0201786 A1 | 10/2004 | Park | | 349/12 |

FOREIGN PATENT DOCUMENTS

JP       54-119899    * 9/1979

* cited by examiner

*Primary Examiner* — Kevin M Nguyen

(74) *Attorney, Agent, or Firm* — Standley Law Group LLP

(57) ABSTRACT

A touch panel is integrated into a flat panel display device having a visual display surface with a front polarizer layer, particularly a liquid crystal display device. The touch panel comprises a flexible transparent membrane containing the front polarizer layer and having a first transparent conductive layer on a lower surface of the flexible transparent membrane and a rigid base comprising the flat panel display device and having a second transparent conductive layer on an upper surface of the rigid base. At least one spacer separates the flexible transparent membrane from the rigid base, keeping the first and second transparent conductive layers in spaced-apart facing relationship. A bus bar and tail communicate a signal from the touch panel to the flat panel display device.

12 Claims, 3 Drawing Sheets

DISPLAY DEVICE WITH INTEGRAL TOUCH PANEL SURFACE

CROSS-REFERENCE TO PRIOR APPLICATION

This application claims the benefit of provisional patent application 60/524,226 filed 21 Nov. 2003, which is incorporated by reference as if fully recited herein.

TECHNICAL FIELD

The present invention relates to an improved touch panel for all types of display devices. Such a touch panel is adapted to be integrated into the front face of the display device, and incorporates a front polarizer layer of the display device into a flexible transparent membrane on an upper surface of the touch panel.

BACKGROUND OF THE ART

Touch panels, particularly of the four-wire membrane resistive type, are known in the prior art. In a typical application, these touch panels have a flexible front membrane and a relatively rigid base. Movement of the flexible membrane responsive to pressure or "touch" makes an electrical connection between a surface of the flexible membrane and a surface of the base plate, the electrical connection generating a signal for the display device. The presence of a prior art touch panel atop a display device inevitably degrades the optical performance characteristics of the display. The techniques for mounting the touch panel generally introduce an air gap between the touch panel and the display, which allows the accumulation of moisture and particulates. Further, the spacers used in the touch panel to separate the flexible membrane from the base plate inherently disrupt viewing of the display, unless the spacers can be aligned with the black mask (BM) in the display, which is virtually impossible to accomplish when the touch panel is a separate unit from the display device.

While there are patents in which the inventors have tried to provide improved touch panels, there is still an unmet need in the market for a touch panel incorporating the front polarizer of a liquid crystal display into a flexible membrane of the touch panel, especially when the touch panel is directly affixed to the liquid crystal display.

SUMMARY OF THE INVENTION

Accordingly, the objects of the present invention are achieved by a touch panel that integrated into a flat panel display device having a visual display surface with a front polarizer layer, particularly a liquid crystal display device. The touch panel comprises a flexible transparent membrane and a rigid base. The flexible transparent membrane contains the front polarizer layer and has a first transparent conductive layer on a lower surface thereof. The rigid base comprises the flat panel display device and has a second transparent conductive layer on an upper surface thereof. A means for spacing the first and second transparent conductive layers in spaced-apart facing relationship separates the flexible transparent membrane from the rigid base. A bus bar and tail communicate a signal from the touch panel to the flat panel display device.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above will become apparent to those skilled in the art from a reading of the following detailed description in conjunction with the accompanying drawings wherein identical reference characters refer to identical parts and in which.

DETAILED DESCRIPTION OF A PREFERRED EMBODIMENT

Figure 1:
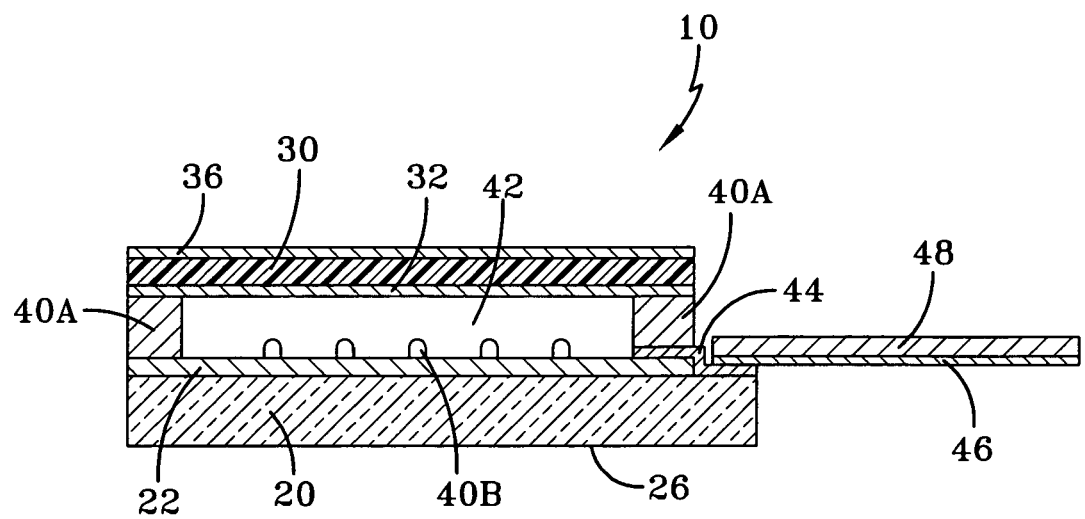
FIG. 1 is a side sectional view of a touch panel as known in the prior art.

FIG. 1 shows a side sectional view of a four-wire resistive touch panel 10, as known in the prior art, and as disclosed more completely in U.S. Pat. No. 6,590,622 to Nakanishi (8 July 2003). Such a touch panel 10 comprises a base plate 20 and a flexible membrane 30. The base plate 20 has a surface 22 that faces a surface 32 of the flexible member 30. Surfaces 22 and 32 each comprise a surface coating of a layer of indium-tin oxide (ITO), as can be applied by known technology, with ITO layer 22 being on base plate 20 and ITO layer 32 being on flexible membrane 30. Each ITO layer has a sheet resistivity of about 500 ohms/square. If in contact with each other, the ITO layers would allow electrical current flow, but the ITO layers are normally kept from electrical communication by a means for spacing 40. One part of the spacing means 40 is a peripheral pressure sensitive adhesive (PSA) edge seal 40a that attaches and seals the flexible membrane 30 to the base plate 20, maintaining an insulating gap 42 and ostensibly preventing intrusion of moisture, particulates and the like. A second part of spacing means 40 is a plurality of spacing bumps 40b, which are positioned on surface 22, surface 32 or a combination of both surfaces. Surface 36 of flexible member 30 is opposite surface 32. When pressure or "touch" is applied to surface 36, surfaces 22, 32 are brought into electrical communication and current flow therebetween may occur.

In a typical touch panel 10 of the prior art, flexible membrane 30 will be a plastic membrane, and even more typically, a poly(ethylene-terephthalate) (PET) membrane that is 4 to 6 mils thick. In most instances, front surface 36 will have at least an anti-glare coating applied thereto, and other coatings may be used. In order to properly adhere the anti-glare (or other) coating, it is known in the prior art to first apply a hardcoat layer to surface 36.

In a typical touch panel 10 of the prior art, base plate 20 will be a glass plate that is in the range of 0.5 to 1.0 mm thick. Base plate 20 will typically be affixed to the display device (not shown) by a layer of PSA applied to surface 26 of base plate 20, surface 26 being opposite surface 22. The typical touch panel 10 of the prior art does not have a polarizing layer in either base plate 20 or flexible membrane 30.

Electrical contact of surfaces 22, 32 is communicated through a bus 44 to a circuit pattern 46 on circuit board 48, which typically is referred to as a "tail." While only one bus is shown in FIG. 1, a second bus is usually provided in a perpendicular direction, so that the coordinates of a "touch" may be determined and a corresponding signal transmitted. Specific details of this technique are clearly known and are not affected by the operation of the present invention.

The typical optical performance of a prior art four-wire resistive touch panel 10 as described above and shown in FIG. 1 is as follows:

Transmission: ≦86%
Specular Reflection: ≦16%
Diffuse Reflection: ≧1.0%

The typical thickness of such a four-wire resistive touch panel is at least 1 mm, plus the thickness of the air gap 42.

Figure 2:
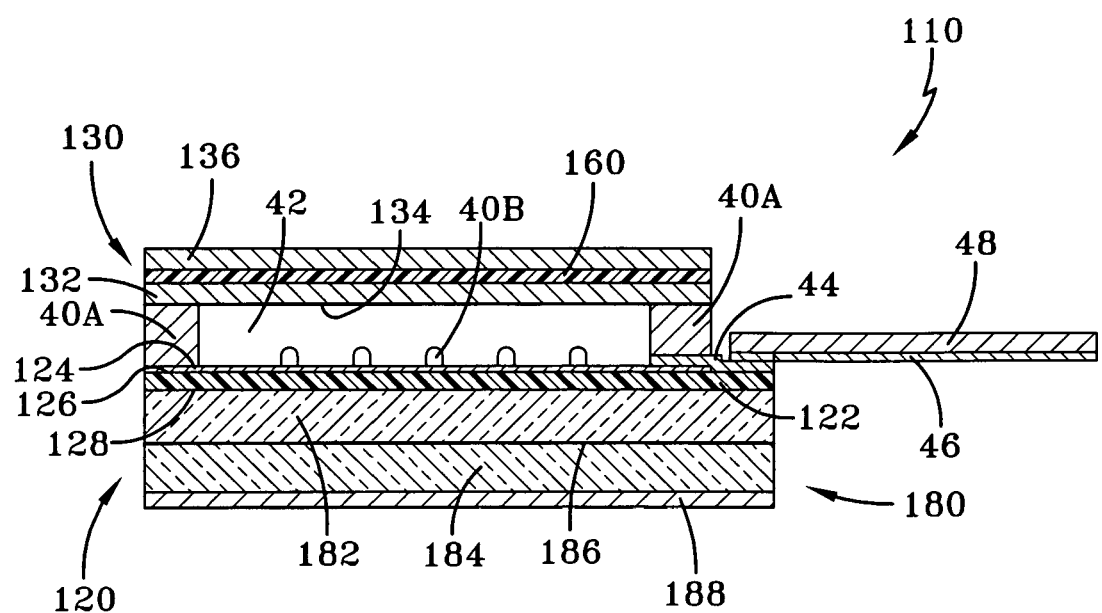
FIG. 2 is a side sectional view of a first embodiment of a touch panel of the present invention.

Attention is now directed to FIG. 2, which shows a side sectional view of a first embodiment touch panel 110 of the present invention. Such a touch panel 110 comprises a base plate 120 and a flexible membrane 130, as in the prior art, but both the base plate and the flexible membrane are different than known in the prior art. As in the prior art, spacing means 40 is used to maintain a non-conductive gap 42 between the base plate 120 and the flexible membrane 130, except when touch is applied to the flexible membrane.

The flexible membrane 130 in the present invention touch panel 110 will be a transparent plastic membrane, but PET is generally unacceptable as a material when the application is in association with a liquid crystal display (LCD). PET, as well as other transparent polymeric films that otherwise might be useful (and that are useful in the prior art) exhibits birefringence that interferes with the polarization of the light passing through the display. A feature of the present invention is the incorporation of the front polarizer layer of the LCD into the flexible membrane 130. In such an embodiment of the present invention, the flexible membrane 130 would be a three-ply composite, comprising a thickness of polarizing material 160, such as iodine-dyed poly(vinyl alcohol) with front and rear surfaces 136, 132 bonded to the polarizing layer. The front and rear surfaces 136,132 will comprise non-birefringent material, such as tri-acetate cellulose (TAC), to avoid the deleterious effects of birefringence. Although polycarbonate materials may be non-birefringent, the polycarbonate materials may not be useful in the flexible membrane, due to inability to properly adhere the necessary surface layers in a manner that will withstand the flexing of the membrane in normal use. Because of the thermal sensitivity of the polarizing material, the front and rear surface layers 136, 132 will typically be prepared with surface coatings before being bonded to the polarizing layer 160. An ITO layer 134 applied to a surface of the rear surface layer 132 faces the non-conductive gap 42 and provides the first of the conductive layers known in the prior art. In most instances, front surface layer 136 will have at least a hardcoat applied to an outer surface, and generally, anti-reflective, anti-smudge and/or anti-glare coatings will be applied. For example, a Nitto Denko ARS (dry vacuum deposition) or equivalent hydrophobic, anti-reflective, front hardcoat may be used. The remaining surfaces of front and rear layers 136, 132 are prepared, if necessary, for bonding to the polarizing layer 160. This transparent flexible membrane 130 is a common aspect of the preferred embodiments of the present invention.

Further attention to FIG. 2 provides details regarding a first embodiment of the base plate 120. In this case, the rigid base is provided by a flexible transparent membrane 122 with an upper surface 126 of the membrane coated with a transparent conductive layer 124 of ITO and a lower surface 128 adapted for affixation to a flat panel display device 180 that comprises a liquid crystal display with rigid front and rear plates 182, 184 having a liquid crystal fluid 186 interposed therebetween and a rear polarizer 188. The front polarizer required for conventional operation of the LCD is, of course, provided in transparent flexible membrane 130. In one expression of this embodiment, flexible transparent membrane 122 will have a pressure sensitive adhesive on a lower surface for affixing the flexible transparent membrane to the flat panel display device 180.

Figure 3:
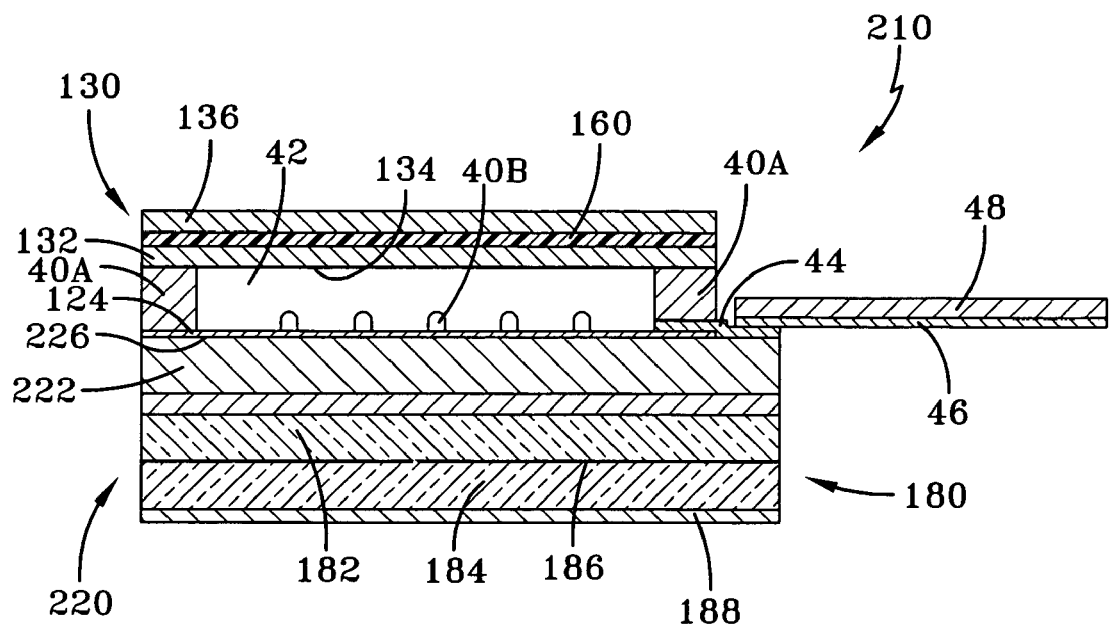
FIG. 3 is a side sectional view of a second embodiment of an integral touch panel of the present invention.

FIG. 3 illustrates a second embodiment touch panel 210 of the present invention, comprising a base plate 220 and a flexible membrane 130. As in the prior art, spacing means 40 is used to maintain a non-conductive gap 42 between the base plate 120 and the flexible membrane 130, except when touch is applied to the flexible membrane. In FIG. 3, the flexible membrane is the same as taught in FIG. 2 and the accompanying text, but the base plate 220 comprises a rigid substrate 222 with the second transparent conductive ITO layer 124 on an upper surface 226 thereof, the rigid substrate being adapted for affixation to the flat panel display device 180, which comprises a liquid crystal display with rigid front and rear plates 182,184, having a liquid crystal fluid 186 interposed therebetween and a rear polarizer 188. The front polarizer required for conventional operation of the LCD is, of course, provided in transparent flexible membrane 130. In one expression of this embodiment, the rigid substrate 222 has a pressure sensitive adhesive on a lower surface for affixing it to the flat panel display device. In another expression of this embodiment, the rigid substrate is the cover glass that is used with the liquid crystal display to provide rigidity and protection to the LCD. In such a case, the bezel (not shown) which holds the cover glass in registration with the LCD front and rear plates provides the affixing capability.

Figure 4:
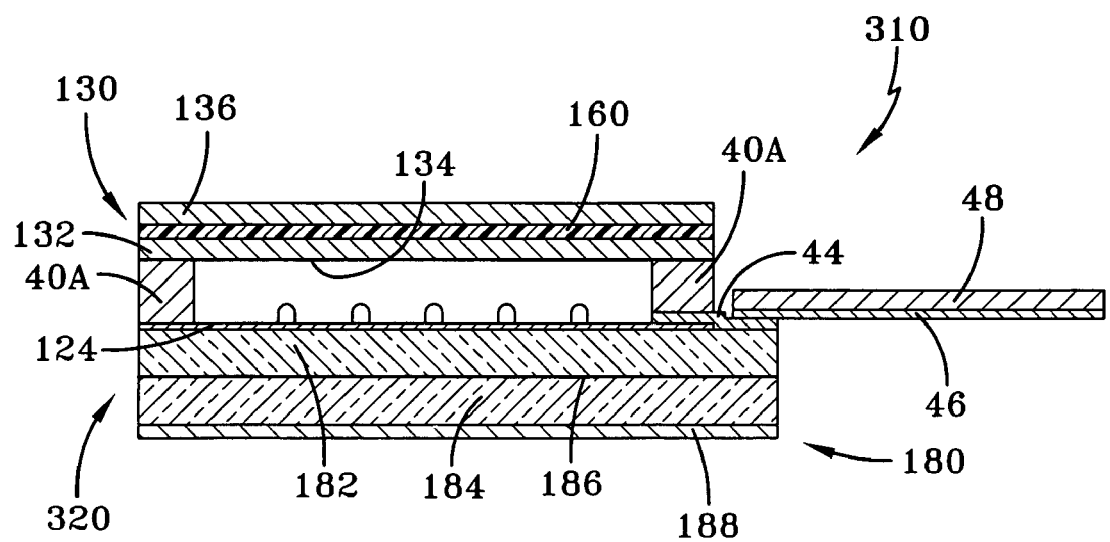
FIG. 4 is a side sectional view of a third embodiment of an integral touch panel of the present invention.

FIG. 4 illustrates a third embodiment touch panel 310 of the present invention, comprising a base plate 320 and a flexible membrane 130. As in the prior art, spacing means 40 is used to maintain a non-conductive gap 42 between the base plate 120 and the flexible membrane 130, except when touch is applied to the flexible membrane. In FIG. 4, the rigid base plate 320 comprises the flat panel display device 180, the flat panel display device further comprising a liquid crystal display with front and rear plates 182, 184, having a liquid crystal fluid 186 interposed therebetween and a rear polarizer 188. In this case, a front surface of front plate 182, which is typically glass, has been coated with the second transparent conductive ITO layer 124. This embodiment has certain inherent advantages over the other embodiments.

It is known in the art to form a conductive ITO layer such as layer 124 on the front surface of a LCD, the ITO layer being used to optimize liquid crystal alignment to significantly increase transmittance in a technology commercially available from BOE Hydis Technology Co., Ltd of the Republic of Korea under the name FFS, an acronym for "fringe field switching." The second transparent conductive layer 124 in third embodiment touch panel 310 can simultaneously function as part of the touch panel of the present invention and function as part of an FFS system.

Figure 5:
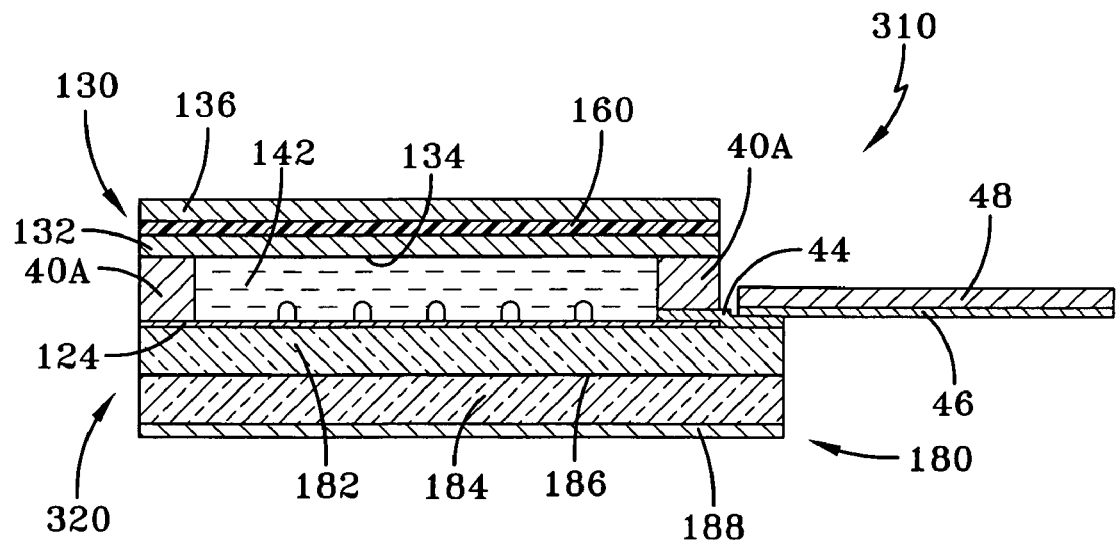
FIG. 5 is a side sectional view of an alternate third embodiment of an integral touch panel of the present invention.

As further shown in FIG. 5, some embodiments of the present invention will have the non-conductive gap between ITO layers 124, 134 filled with a transparent insulating liquid 142 instead of gas or air. Although embodiment 310 is specifically shown in FIG. 5, the insulating liquid 142 may be used in association with the other embodiments 110, 210 as taught herein. An embodiment utilizing a transparent colorless insulating liquid 142 is particularly preferred when a liquid is selected that has an index of refraction which minimizes reflection. While the non-compressible nature of a liquid will tend to obviate the need for spacer bumps 40b as described above, it may be useful in some embodiments to use both the insulating liquid and the spacer bumps, so they are illustrated in FIG. 5, although their use is optional.

Figure 6:
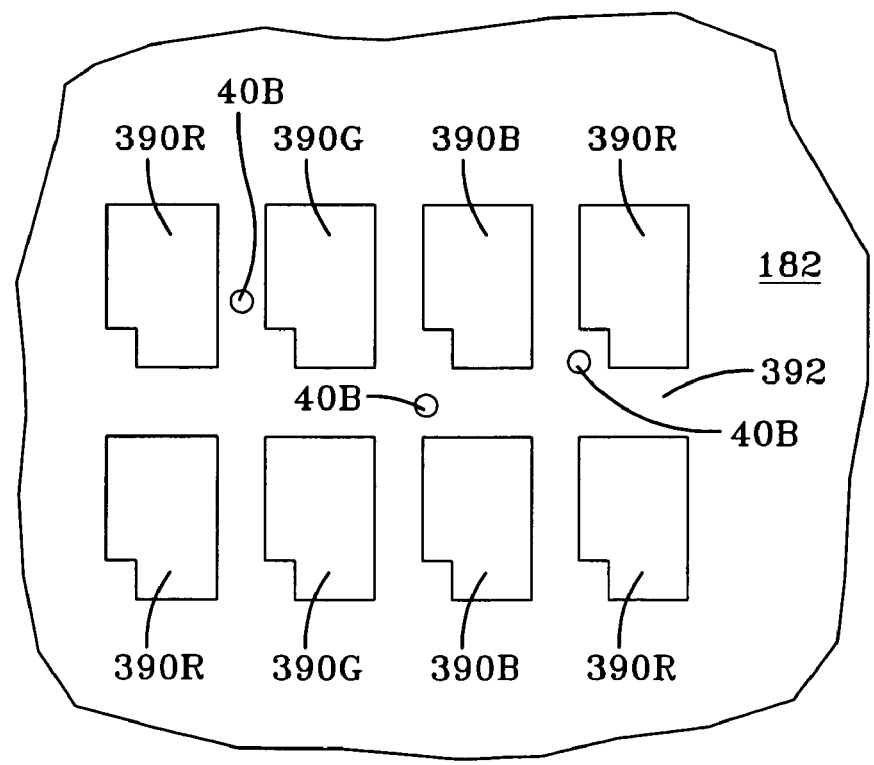
FIG. 6 is a partial plan view of the third embodiment integral touch panel as in FIG. 4.

A further advantage of the third embodiment touch panel 310 is illustrated in the partial plan view of FIG. 6. As is well known in liquid crystal technology, the front plate 182 and the rear plate 184 are manufactured so that color filters, thin film transistors (TFTs) and a black mask are precisely positioned on the inner surfaces of the plates to divide the display area into active pixel areas 390 and masked portion 392. When viewed in the plan view of FIG. 5, the red, green and blue subpixels 390R, 390G and 390B and black mask 392 are easily observed. If spacer bumps 40b are used, they may be similarly precisely sized and positioned (in terms of the "x" and "y" directions of the display) on the front surface of the front plate 182, along with the ITO layer 124, so that none of the spacer bumps are juxtaposed with an active pixel 390. In this third embodiment 310, the direct utilization of the front plate 182 eliminates a layer of thickness. The accurate placement of the spacer bumps 40b on the front surface of front plate 182 further the objective of an undistorted view of the display. While FIG. 5 shows more spacer bumps 40b than would typically be used in the illustrated area, the spacer bumps shown are all precisely placed in positions where they do not interfere with any active pixel areas 390. Touch panels of the prior art cannot achieve this precise alignment (that is, alignment in the "z" direction), so some spacers are placed over the black mask and some are placed over the active pixel or color dots 390 of the display, thereby disrupting the visual impact of the display to some extent. Also, the spacer bumps 40b of the present invention are within about 0.7 mm (the thickness of the display front plate) from the black mask in the "z" direction. In the prior art touch panel, the minimum reasonable "z" direction spacing between the spacers and the black mask is in the range of about 1.95 to 2.45 mm. This minimum spacing comprises 0.7 mm for the front plate of the display, 0.25 mm for polarizer thickness, 0.5 mm for the air gap and 0.5 to 1.0 mm for the rear glass of the touch sensor. This "z" direction spacing found in the prior art device produces shifting moire or interference patterns between the spacers and the black mask with changing viewing angles due to significant parallax resulting therefrom.

The ITO layers 124,134 of the present invention will preferably be at least single-index matched, and preferably, double-index matched (DIM).

In any of the embodiments of the present invention, the bus and tail connections as known in the prior art will be provided so that the same "four-wire" functionality is preserved, and the electrical signals obtained will be immediately useful to one of skill in the art.

Another benefit of placing the ITO layers between the front polarizer and the display itself is to reduce specular reflection in the range of 60 to 70%, due to the polarization.

While the present invention has been described in association with a four-wire resistive touch panel using touch panel circuitry as known in the prior art, any of the embodiments taught herein are equally useful in association with a five-wire resistive touch panel, also as known in the prior art. As one of skill in this art will recognize, the four-wire touch panel utilizes two spaced-apart transparent resistive layers, while the five-wire scheme utilizes only one transparent resistive layer and a top metal contact area separated by insulating spacers.

If the display with which the touch panel of the present invention is used is not an LCD, that is, if the display is an OLED display, for example, a front circular polarizer may be used as the flexible membrane instead of a linear polarizer. In cases where a circular polarizer is located between the ITO layers and the observer, specular reflection will inherently be reduced by more than 95%.

When the present invention is employed, as in the embodiment presented herein, optical performance is:
Transmission: $\geq 92\%$ (compared to $\leq 86\%$ in prior art)
Specular Reflection: $\leq 2\%$ (compared to $\geq 16\%$ in the prior art)
Diffuse Reflection $\leq 0.10\%$ (compared to $\geq 1.0\%$ in the prior art).

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention.

What is claimed is:

1. A flat panel liquid crystal display device comprising:
a front transparent rigid base;
a rear transparent base;
a liquid crystal fluid layer sandwiched between the front and rear bases;
a rear polarizer layer on the rear transparent base; and
a touch panel integrated into the display device over the front transparent rigid base, the touch panel comprising:
a transparent flexible membrane including a front polarizer layer, a
first transparent conductive layer on a lower surface of the front polarizer layer; and
a second transparent conductive layer on an upper surface of the front transparent rigid base;
wherein the first and second transparent conductive layers are double-index matched;
a plurality of spacer bumps between the lower surface of the transparent flexible membrane and the upper surface of the rigid base,
wherein the spacer bumps are sized and positioned such that they do not obstruct an active pixel area; and
bus bars and a tail connected to the conductive layers.

2. The device of claim 1, wherein:
the first and second transparent conductive layers comprise first and second facing films of indium tin oxide.

3. The device of claim 1, further comprising:
a peripheral seal that, in conjunction with the lower surface of the transparent flexible membrane and upper surface of the rigid base, defines a cavity.

4. The device of claim 3, wherein:
the cavity is filled with a transparent insulating liquid.

5. The device of claim 1, wherein:
the transparent flexible membrane comprises:
a first and a second layer of a non-birefringent material; and
the front polarizer layer, which is a layer of a linear polarizing material,
interposed between the first and second layers of non-birefringent material.

6. The device of claim 5, wherein:
the first and second non-birefringent layers comprise cellulose triacetate.

7. The device of claim 5, wherein:
the linear polarizing material is a poly(vinyl alcohol).

8. The device of claim 5, wherein:
an upper surface of the first layer of non-birefringent material is coated with an
anti-reflectant material.

9. The device of claim 8, wherein:
the upper surface of the first non-birefringent layer is coated with the anti-reflectant material before the front polarizer layer is interposed between the second non-birefringent layer and a lower surface of the first non-birefringent layer.

10. The device of claim 5, wherein:
an upper surface of the first layer of non-birefringent material is coated with an anti-glare material.

11. The device of claim 5, wherein:
a lower surface of the second layer of non-birefringent material is coated with a layer of indium tin oxide to provide the first transparent conductive layer.

12. The touch panel device of claim 11 wherein:
the lower surface of the second non-birefringent layer is coated with the indium tin oxide layer before the front polarizer layer is interposed between the first non-birefringent layer and an upper surface of the second non-birefringent layer.

* * * * *